United States Patent [19]

Phillips

[11] 4,389,193

[45] Jun. 21, 1983

[54] EDUCATIONAL DEVICE

[76] Inventor: Morton Phillips, 67-70 Yellowstone Blvd., Forest Hills, N.Y. 11375

[21] Appl. No.: 335,234

[22] Filed: Dec. 28, 1981

[51] Int. Cl.$^3$ .............................................. G09B 1/22
[52] U.S. Cl. ................................... 434/174; 434/404
[58] Field of Search ............... 434/174, 172, 173, 171, 434/208, 404

[56] References Cited

U.S. PATENT DOCUMENTS

| | | | |
|---|---|---|---|
| 1,833,793 | 11/1931 | Pfleger | 434/174 |
| 2,066,871 | 1/1937 | Wolfe | 434/172 |
| 2,370,229 | 11/1931 | Buckley | 434/174 |
| 2,411,717 | 11/1946 | Fay et al. | 434/174 |
| 2,608,006 | 8/1952 | Mulvihill | 434/174 |
| 3,460,273 | 8/1969 | Boyd | 434/174 |
| 3,798,797 | 3/1974 | Mandel | 434/171 |

FOREIGN PATENT DOCUMENTS

| | | | |
|---|---|---|---|
| 625457 | 2/1936 | Fed. Rep. of Germany | 434/174 |
| 1228284 | 3/1960 | France | 434/174 |

Primary Examiner—William H. Grieb
Attorney, Agent, or Firm—Darby & Darby

[57] ABSTRACT

An educational device for teaching beginning readers how to read includes three independently rotatable discs. The first disc includes a series of word families; the second disc contains a series of word family windows through any of which any of said word families can be viewed, and an initial sound printed adjacent each of said word family windows; and the third disc contains a word window through which a complete word (i.e., an initial sound and word family) can be viewed, and an initial sound window through which one of said initial sounds can be viewed before the complete word is formed in the word window.

9 Claims, 4 Drawing Figures

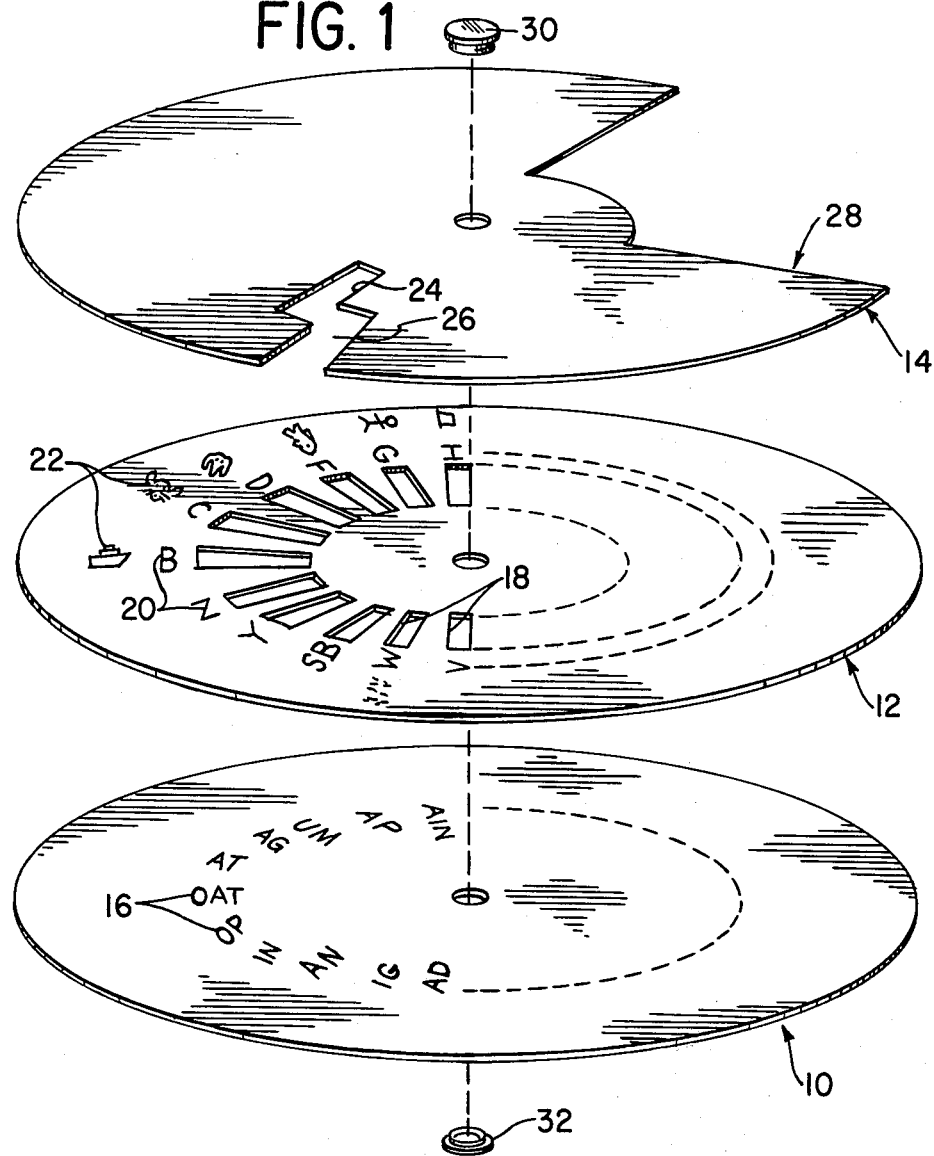

EDUCATIONAL DEVICE

This invention relates to an educational device of the type useful in teaching young children to read.

BACKGROUND OF THE INVENTION

Various different educational devices or games have been proposed to teach reading. Representative devices of this type may be found in U.S. Pat. Nos. 1,833,793, 2,370,229, 3,460,273 and 3,798,797. These devices, and others of the same type, generally involve movable (e.g., rotatable) members containing, respectively, various initial sounds and word families. The student, by manipulating these members, produces various combinations of letters which the beginning reader learns to recognize and pronounce.

OBJECT OF THE INVENTION

The principal object of the invention is to provide an improved educational device for teaching beginning readers to read.

Another object of the invention is to provide an educational device of the type described which is attractive to young children and which can be used for a wide range of beginning readers, for example, from kindergarten to about third grade.

BRIEF DESCRIPTION OF THE INVENTION

In the preferred embodiment, there is provided three discs rotatable with respect to each other about a common axis. The lower-most disc contains a series of word families printed on its upper surface. The middle disc includes a series of windows through which each of the word families on the bottom disc can be viewed. Adjacent each of the windows is an initial sound (e.g., a consonant) which can form a word with the word family framed in the window. In the preferred embodiment a picture suggestive of the initial sound is printed adjacent each of the initial sounds. The upper disc includes a word window through which the initial consonant and the word family (framed in the word family window) can be viewed. Peripherally displaced from the word window in the upper disc is an initial sound window in which the initial sound (and associated picture) can be viewed to the exclusion of any of the word families.

With this arrangement, the beginning reader first positions the bottom and top discs so that a selected word family is beneath the word window. As the middle disc is moved, an initial sound (and its associated picture) appear in the initial sound window. At the same time, the selected word family is covered by a section of the middle disc between adjacent word family windows. The user then rotates the middle disc until the initial sound appears in the word window. When that happens, the word family will be uncovered by a word family window within the word window so that the user sees the entire word consisting of the initial sound and word family.

THE DRAWINGS

FIG. 1 is an exploded perspective view showing a preferred embodiment of the invention;

DETAILED DESCRIPTION

Figure 3:
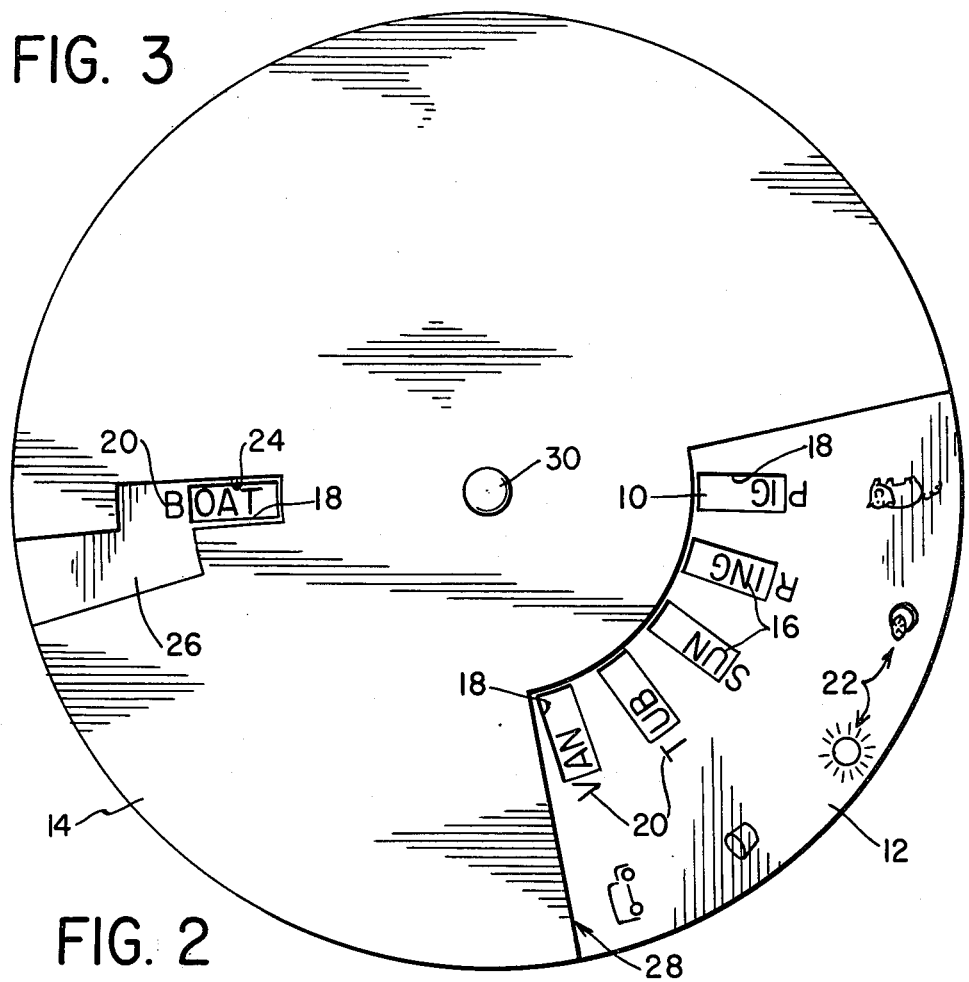
FIG. 3 is a plan view of the entire device showing the middle disc moved to its final position where the initial sound and word family form a word.

In describing the preferred embodiment of the invention, "words" are formed by combining "initial sounds" and "word families". This terminology is used solely for the purpose of explanation and is not intended to be limiting in any respect. Thus, as used in the specification and claims, the term "word" is intended to mean any assemblage of letters or characters; the terms "initial sound" and "word family" may refer to one or more letters or characters with the combination of a word family and initial sound forming a "word". As a practical matter, and in the preferred embodiment, the initial sound ordinarily includes one or two consonants and the word family will contain the vowel(s). Representative examples are shown in the drawings.

In the preferred embodiment, there are bottom, middle and top discs 10, 12 and 14, respectively. The bottom disc 10 contains a multiplicity of word families 16 arranged in a ring as shown, with the letters of a single word family aligned in a generally radial direction.

The middle disc 12 includes a series of word family windows 18 also aligned in a ring and adapted to overlie the individual word families 16 on the bottom disc 10. Printed on the middle disc 12 next to each of the word family windows 18 is an initial sound 20 and an associated picture 22 intended to suggest to the beginning reader the sound of the associated initial sound 20. For example, as shown in FIG. 1, the picture of a boat is placed next to the printed letter B.

The top disc includes a word window 24 and an initial sound window 26 close to but slightly displaced from the window 24. The word window 24 is large enough to frame initial sound 20 together with its entire associated word family window 18. The initial sound window 26 frames only one of the initial sounds 20 and its associated picture 22.

Figure 2:
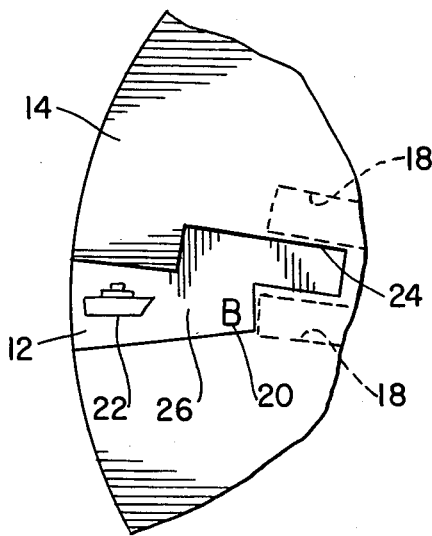
FIG. 2 is a fragmentary plan view showing how the picture and initial consonant would appear in the initial sound window of the top disc.
Figure 4:
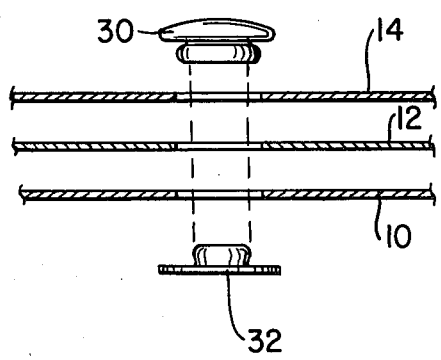
FIG. 4 shows how the three discs may be secured together.

Preferably, windows 24 and 26 are arranged with respect to the spacing between the windows 18 so that when an initial sound 20 and picture 22 appear in the window 26, the word window 24 is blocked by the section of disc 12 between adjacent word family windows 18. This is shown, for example, in FIG. 2 where the picture of a boat and the letter B appear in window 26 but the window 24 is blank.

The top disc 14 also includes a large cutout area 28 capable of exposing, for example, about one-quarter of the underlying middle disc 12 and the characters printed thereon. As will become more apparent from the following description of how the invention is used, this facilitates rotation of the middle disc and makes it easier for the user to locate the word families and initial sounds with which he or she intends to work.

The three discs 10, 12 and 14 are rotatable about a common axis. Preferably, the disc may be held together by a snap-on fastener 30, 32 of conventional form. This makes replacement of the discs 10 and 12 very simple so that a series of printed discs of progressively difficult initial sounds and word families can be readily interchanged.

The invention may be used in different ways. Ordinarily, in the case of a beginning reader, a word family will be selected by first rotating discs 12 and 14 with respect to each other so that one of the word family windows 18 is framed within the word window 24. Holding discs 12 and 14 stationary, the user may then rotate the bottom disc 10 until a selected word family 16 (e.g., "AT") is seen through the aligned windows 24 and 18. The bottom and top discs 10 and 14 are then held stationary and the middle disc 12 is rotated. This causes each of the initial sounds 20 and its associated picture 22 to appear in succession in the window 26. At the same time, the portion of the middle disc 12 between adjacent windows 18 blocks the word family 16 (e.g., "AT" in this example) so that the user sees only the initial sound 20 and picture 22 in the window 26 (see FIG. 2).

The picture of the boat will help the beginning reader to pronounce the consonant B. When he or she has pronounced the initial sound, the middle disc 12 is then rotated until the initial sound ("B") appears in the word window 24. Of course, at the same time the window 18 adjacent the consonant B will also appear beneath the word window 24 so that the selected word family ("OAT") and the consonant just pronounced appear together in the window 24. The user can then read the word "boat". He or she then continues with the next initial sound, pronouncing first the initial sound and then the word formed with the selected word family using that initial sound.

The invention can be readily designed for use with beginning readers through the third grade since it is easy to assemble and disassemble the device. Discs 10 and 12 may have characters printed on both sides or the device may be sold with replacement discs to be used as desired.

What is claimed is:
1. An educational device, comprising:
   a first member having a surface containing a series of word families,
   a second member movable with respect to said first member and including a series of word family windows through any of which any of said word families can be viewed, said second member further having an initial sound printed adjacent each of said word family windows, and
   a third member movable with respect to said second member and including a word window through which an entire one of said complete words can be viewed and an initial sound window through which one of said initial sounds can be viewed.
2. An educational device according to claim 1, wherein said second member also contains a picture in proximity to each of said initial sounds, and wherein said word window is large enough to frame both an initial sound and its associated picture.
3. An educational device according to claim 2, wherein said members are rotatable about a common axis.
4. An educational device according to claim 3, wherein said members are secured together by a replaceable fastener at said axis.
5. An educational device according to claim 4, wherein said third member includes a cut-out area exposing a substantial part of the initial sounds printed on said second member.
6. An educational device, comprising:
   a first rotatable disc having a surface containing a series of word families,
   a second disc rotatable with respect to said first disc and including a series of separated word family windows through any of which any of said word families can be viewed, said second disc further having an initial sound printed adjacent each of said word family windows, each initial sound being adapted to form a complete word with one or more of said word families when framed in the associated window, and
   a third disc rotatable with respect to said second disc and including a word window through which an entire one of said complete words can be viewed and an initial sound window through which one of said initial sounds, but not a word family, can be viewed, said initial sound window being displaced from said word window in the direction of movement a distance such that when the initial sound appears in said initial sound window the space between adjacent word family windows appears in said word window.
7. An educational device according to claim 6, wherein said second disc also contains a picture in proximity to each of said initial sounds, and wherein said word window is large enough to frame both an initial sound its associated picture.
8. An educational device according to claim 6, wherein said discs are secured together by a replaceable fastener at a common axis.
9. An educational device according to claim 6, wherein said third disc includes a cut-out area exposing a substantial part of the initial sounds printed on said second disc.

* * * * *